US007896991B2

(12) United States Patent
D'Silva et al.

(10) Patent No.: US 7,896,991 B2
(45) Date of Patent: Mar. 1, 2011

(54) METHOD FOR MANUFACTURING RESIN MATS

(75) Inventors: Sean Charles D'Silva, Englewood, CO (US); Thomas F. Stehlin, Kriftel (DE)

(73) Assignee: Johns Manville, Denver, CO (US)

( * ) Notice: Subject to any disclaimer, the term of this patent is extended or adjusted under 35 U.S.C. 154(b) by 4 days.

(21) Appl. No.: 11/983,165

(22) Filed: Nov. 7, 2007

(65) Prior Publication Data
US 2008/0108269 A1 May 8, 2008

(51) Int. Cl.
B32B 17/04 (2006.01)
(52) U.S. Cl. .................... 156/62.2; 156/276
(58) Field of Classification Search ............ 156/62.2, 156/179, 276; 264/112, 121; 425/83.1
See application file for complete search history.

(56) References Cited

U.S. PATENT DOCUMENTS 3,956,055 A * 5/1976 Duft et al. ............... 156/438
3,957,556 A * 5/1976 Wilson et al. ............ 156/87
2003/0100651 A1* 5/2003 Guha et al. ............. 524/425
2005/0082721 A1* 4/2005 Haque et al. ............ 264/324
2005/0098910 A1* 5/2005 Andersen ................ 264/39
2006/0137798 A1* 6/2006 Haque .................... 156/62.2

FOREIGN PATENT DOCUMENTS

EP      0012464 A1 *  6/1980

* cited by examiner

Primary Examiner—Michael A Tolin
(74) Attorney, Agent, or Firm—Robert D. Touslee

(57) ABSTRACT

The present invention relates to a method for the manufacture of sheet molding compounds (SMC) in which the required glass fiber nonwovens are manufactured in-line and have an inhomogeneity of 10% or less, a weight per unit area of 400 $g/m^2$ or higher and a strength of less than 10 N. Furthermore, the present invention describes resin mats that comprise the glass fiber nonwovens in accordance with the invention that represent valuable intermediate products.

10 Claims, No Drawings

METHOD FOR MANUFACTURING RESIN MATS

FIELD OF ART

The present invention relates to a method for manufacturing glass-fiber nonwovens suitable as resin mats in the manufacture of sheet molding compounds (SMC).

BACKGROUND

Resin mats, especially sheet molding compounds (SMC) have long been used in the art. Thus, the manufacture of SMC and the further processing to components have also been known for a rather long time. In the customary SMC manufacturing process a layer of a resin is applied on a foil. Then, in the next step chopped fibers of reinforcement materials—usually glass fibers—are applied onto this resin layer. The chopped fibers are produced in-line in that a rather large number of so-called glass-fiber rovings are supplied and are cut with the aid of choppers. A further resin layer and a further foil complete the SMC manufacturing process.

After the manufacture of the SMC a ripening of a few days is necessary. During this time chemical reactions take place that alter the viscosity of the resin and aid a further impregnation of the fiber layer. Then, a partial dissolution of the fiber bundle structure takes place during the following pressing operation on account of the acting shearing forces.

Preferred SMC's have a high degree of flowability that makes it possible, e.g., that the press form only has to be covered to 30 to 50%. In addition, there is the achievable surface quality, which is possible up to class A levels. Resin mats that comprise a fabric or a fiber nonwoven of continuous fibers frequently have a reduced flowability. Accordingly, such resin mats must be introduced into the press form with great precision. Furthermore, the surface quality of the form parts produced can be disadvantageously influenced by such reinforcing mats.

The presented manufacture of SMCs with chopped fibers is as a rule a relatively complex and slow process. As described, in-line cut glass fibers are generally used for it that are produced on site from so-called rovings. As a consequence, a large number of spools, supply equipment and other devices are required that require a significant amount of work and can readily result in technical problems. As a result, problems of quality and yield immediately result, e.g., by a standstill of the machines, that frequently cause significant expenses. Furthermore, the cutting of the fibers limits the speed of the manufacture of SMC's.

WO99/55521 attempts to generate a glass-fiber layer with a wet deposition method in an in-line process. This method is expensive and requires extensive additional measures on account of the necessary drying. Furthermore, significant properties of the glass-fiber nonwovens are not described.

WO001/19599 describes a method in which a layer of unidirectional reinforcement fibers are inserted in the SMC process that are additionally covered with chopped fibers. This method is particularly suited for applications that take into consideration the special requirements for strength in a preferred direction. Moreover, significant properties of the glass-fiber nonwovens are not described.

Finally, WO 2005/254559 describes a method for the manufacture of needled glass-fiber mats that can then also be used for SMC-like components. However, the needling of a mat constitutes an additional and expensive process step. Furthermore, substantial properties of the glass-fiber nonwovens are not described. Thus, a needling potentially results in particular in a very permanent solidification of the nonwovens. Therefore, the flowability of the resin mats manufactured from these glass-fiber mats is relatively low.

Document US2005/0082721 describes mats having glass fibers and plastic fibers. However, this document contains no suggestions concerning reaction resins. Moreover, significant properties of the mats are not described.

The European patent application (EP JM05002) discloses glass-fiber nonwovens and their use as resin mats in SMCs, the glass-fiber nonwovens having an inhomogeneity of at the most 10%, a weight per unit area of at least 600 g/m2 and a strength of at least 10 N. The required strength of at least 10 N means that the glass-fiber nonwoven must be strengthened with a binder or by other strengthening methods (e.g., needling). It is possible with the aid of glass-fiber nonwovens designed in this manner to manufacture them in advance and introduce them into the SMC process. In this manner the in-line cutting of the rovings can be eliminated.

On the whole, it should be determined that the current resin mats frequently satisfy the given purpose. However, the manufacture of these resin mats is expensive, complex and subject to errors. Moreover, the method can not be carried out in a flexible manner.

Therefore, there was the task of indicating a method with which resin mats can be economically and reliably manufactured. The resin mats obtained in this manner should be able to be processed to form parts with a high surface quality.

Furthermore, the resin mats should be able to be processed in a simple manner and the resin mats should exhibit a high flowability.

DETAILED DESCRIPTION

Therefore, subject matter of the present invention is constituted by a method for the manufacture of sheet molding compounds (SMC) comprising the steps:

A. Application of a resin layer on a carrier foil,

B. In-line production of a glass-fiber nonwoven of glass staple fibers and depositing of the nonwoven on the coated carrier foil obtained according to step A), C. Application of a further resin layer and of a further carrier foil on the areal structure obtained according to step B), characterized in that the glass-fiber nonwoven formed in step B) has an inhomogeneity of at the most 10% and a weight per unit area of at least 400 g/m$^2$ and that no binder is added to the glass-fiber nonwoven.

Glass nonwovens whose strength is less than 10 N or that do not have any intrinsic strength can be used with the aid of the method in accordance with the invention.

The production of the glass-fiber nonwoven of glass staple fibers in step B) takes place in-line, that is, the glass nonwoven is formed and directly deposited on the resin-coated carrier foil and is not supplied in the form of an already previously manufactured glass nonwoven. The glass-fiber nonwoven formed in accordance with the invention is not subjected to any additional mechanical strengthening, e.g., to a needling before it is further processed.

It was found that the in-line formation of the glass nonwoven preferably takes place with an airlaid method.

The glass-fiber nonwovens produced in step B) represent valuable intermediate products for the manufacture of resin mats. Accordingly, resin mats comprising the glass-fiber nonwovens of the invention are also subject matter of the present invention.

In particular, the following advantages are achieved by the present invention:

The glass-fiber nonwovens in accordance with the invention make possible an economic manufacture of resin mats, especially of prepregs and/or sheet molding compounds (SMC). Thus, in particular the cutting of glass-fibers during the manufacturing process of the resin mats can be eliminated. This can simplify the process of manufacturing resin mats, which achieves cost advantages.

The form bodies obtained by hardening the resin mats display a great strength as well as a high surface quality.

The resin mats obtainable by using the glass-fiber nonwovens of the present invention can be processed in a known manner, during which these resin mats display a high flowability and a relatively low part of the press form has to be covered. The strength and rigidity can be varied within a broad spectrum as a function of the reinforcement material.

The method in accordance with the invention can make use of prefabricated, cut glass fibers or glass-fiber rovings. The expensive and susceptible in-line cutting process of the rovings is eliminated, so that additional components and devices such as, e.g., roving feeds, creels, monitoring apparatuses, etc. that are necessary on account of the large number of rovings to be supplied, can be avoided. This also reduces the investment expense of the SMC process. As a result thereof, the expenses for manufacturing the resin mats can be reduced. In addition, the quality of the resin mats, in particular the constancy of the quality, which can suffer from the frequent starting up of the SMC process, can be improved.

A further advantage of the method in accordance with the invention is that the previously limiting cutting process was eliminated so that the entire SMC process can be carried out with higher speeds than previously.

The glass fibers for SMC used in step B) are known to those skilled in the art and are not subject to any particular limitation. Suitable glass fibers are described, among other places, in Ullmann's Encyclopaedia of Industrial Chemistry, 5$^{th}$ edition on CD-ROM (keyword: Fibres). Suitable glass fibers comprise those manufactured from A-glass, E-glass, S-glass, C-glass, T-glass or R-glass.

The glass fibers preferably have a diameter in the range of 5 to 20 µm, especially preferably of 8 to 18 µm and quite especially preferably of 10 to 15 µm and a length in the range of 6 mm to 100 mm, preferably in the range of 10 to 75 mm and especially preferably in the range of 15 to 60 mm. Glass fibers can be produced in a very flexible manner with the aid of the in-line production, in accordance with the invention, of the glass nonwoven in step B). Mixtures of different glass fiber lengths and glass fiber diameters can be deposited simultaneously or even successively with the aid of the method in accordance with the invention. This has the consequence that the products to be manufactured can be more readily varied. When prefabricated glass nonwovens are used, as is described, e.g., in the European patent application No. 06017473.7, every changeover is to be equated with an interruption of production. The method in accordance with the invention is helpful here. Every change of the glass nonwoven can be carried out in the running procedure without it being equivalent to an interruption of production.

Moreover, the glass-fibers can comprise known additives. For example, the glass fibers can comprise known sizing agents with which the adhesion properties of the glass fibers can be changed.

The glass staple fibers or chopped glass-fiber rovings used to manufacture the glass-fiber nonwoven can also contain further fibers. These fibers are not binding fibers but rather fibers that adjust the application properties for the later usage as SMC. Suitable additive fibers are, e.g., carbon fibers, other mineral fibers and aramid fibers such as Kevlar® and Nomex®, the enumeration not being final at this point.

The glass fibers used in step B) are preferably present in the form of bundles. "Bundle" means that the glass fibers have a certain order in the longitudinal direction. The bundles preferably have 10-100, especially preferably 100 to 500 glass fibers and especially preferably 200 to 300 glass fibers.

Preferably, at least 50% by weight, especially preferably at least 70% by weight of the glass fibers relative to the weight of the glass fibers are in the glass-fiber nonwoven in the form of bundles.

The glass-fiber bundles, also called glass-fiber strands, preferably have a titer in the range of 20 to 200 tex, especially preferably 30 to 160 tex and quite especially preferably in the range of 40 to 120 tex.

The glass-fiber nonwoven produced in step B) has an inhomogeneity of the fiber distribution (weight per unit area) of less than 10%, preferably less than 5% over the width of the nonwoven. The standard deviation of the average weight per unit area distribution or with a width of the nonwoven is preferably at the most 5%, especially preferably at the most 2.5%. The inhomogeneity can be determined according to ISO 3374.

The weight per unit area of the glass-fiber nonwoven produced in step B) is preferably in the range of 400 to 2500 g/m$^2$, preferably in the range of 800 to 1500 g/m$^2$ and especially preferably in the range of 900 to 400 g/m$^2$. The weight per unit area is determined according to ISO 3374.

The glass-fiber nonwoven produced in step B) preferably has a strength in the range of less than 10 N, preferably less than 9.5 N and especially preferably less than 9 N. The strength can be determined according to ISO 3342 and refers to 5 cm of sample width.

No binders are added to the glass-fiber nonwoven produced in step B), so that it has an improved flowability in the SMC process.

The carrier foils used in step A) are known to those skilled in the area of SMC processes and are not subject to any particular limitation. Foils of PE/PA/PE are used as carrier foil or PE foils for favorable applications.

The resins used in step A) are known to those skilled in the area of SMC processes and are not subject to any particular limitation. The reaction resins described in the following are preferably used.

Preferred devices and parameters for airlaid methods are described in WO 99/36622, WO 99/36623 and WO2005/044529. The parameters cited in the previously cited application publications are also part of this description.

The adjustment of the individual method parameters, e.g., the air pressure and/or the air speed in the airlaid methods can be readily adjusted since these methods have long been known.

The glass-fiber nonwovens produced in step B) can be used in particular for the manufacture of resin mats. Resin mats comprise at least one hardenable compound in addition to the glass-fiber nonwoven.

Any reaction resin can be used for manufacturing the resin mats in accordance with the invention that is customarily used in the area of SMC or prepreg technology. Such reaction resins are presented, among other things, in detail in Ullmann's Encyclopaedia of Industrial Chemistry, 5$^{th}$ edition on CD-ROM.

This includes, in particular epoxide resins, unsaturated polyester resins, vinylester resins, polyimide resins, cyanate ester resins, phenolic resins, melamine resins and bismaleinimide resins.

Furthermore, the previously cited resins can also be used as mixtures containing two or more of these resin systems.

Preferably, reaction resins in accordance with the invention and based on unsaturated polyesters can be used that harden under the use of polymerization and cross linking to duroplastic masses. Unsaturated polyester resins frequently contain as additional components copolymerizable monomers such as, e.g., styrene, alpha-methylstyrene, vinyltoluene, methylmethacrylate as solution agent or dilution agent as well as bifunctional monomers, among others, divinyl benzene, diallylphthalate as cross-linking agent.

Catalysts are usually used to harden the previously presented reaction resin systems. The catalysts are selected here in accordance with the reaction resins used.

Unsaturated polyester resins or vinylester resins can generally be hardened by polymerization initiators such as, e.g., peroxides. t-Butyl-per-2-ethylhexanoate, bis-(4-t-butylcyclohexyl)-peroxydicarbonate, benzylperoxide and methylisobutylketone peroxide are cited by way of example. Furthermore, these hardening agents can be used as mixtures.

UV photoinitiators like those that release in particular a Louis or Bronsted acid by irradiation can be used for systems containing the acrylate functions. Examples comprise triarylsulfonium salts containing anions such as, e.g., tetrafluoroborate or hexafluoroborate.

Furthermore, the reaction resins can comprise additives such as, e.g., pigments, UV stabilizers, mold release agent, flameproofing agents and shrinkage-compensating additives.

The shrinkage-compensating additives include, among others, saturated polyesters, polyurethanes, polyvinylacetate, polymethylmethacrylate, polystyrene or styrene-butadiene copolymers or mixtures of these additives.

The resin mats in accordance with the invention include, among others, sheet molding compounds (SMC), that have a relatively high proportion of fillers, thickening agents and pigments, as well as prepregs, which have a lesser proportion of fillers, thickening agents and pigments.

SMC is the English designation for a resin mat according to DIN 16913. A typical SMC recipe comprises approximately 15 to 45% by weight reaction resin, 15 to 15% by weight fillers and 15 to 45% by weight glass-fiber nonwoven. In addition, the SMC recipe can comprise further additives such as, e.g., coloring pigments, hardening agents, dispersing agents, thixotroping agents, thickening agents, adhesive agents and/or separating agents.

Alkali oxides and/or earth-alkali oxides or hydroxides and/or isocyanates can be used as thickening agents.

In the context of the method in accordance with the invention at first a reaction resin mixture that can comprise further additives and fillers in addition to the reaction resin is applied onto a carrier foil. The application is a function of the desired weight per unit area. Subsequently, the coated carrier foil is used in-line, that is, immediately, as a place of deposit for the glass nonwoven produced by airlaid technology. To this end, the coated carrier foil is used in-line as a depositing band for the airlaid manufacture of a glass nonwoven. As a result of the method in accordance with the invention the glass-fiber nonwovens formed do not have to be self-supporting and do not have to be able to be rolled up. No minimal strength requirements are placed on the glass nonwovens, which has the consequence that the glass nonwovens formed in-line are also not subjected to any mechanical strengthening, e.g., needling, or stabilized by additional binders before they are deposited on the coated carrier foil.

In a next stage at first a layer of reaction resin that can also comprise additives, e.g., fillers, is applied on a second carrier foil. The second carrier foil is applied from above onto the glass-fiber nonwoven produced in-line with the surface of the carrier foil provided with reaction resin facing in the direction of the glass-fiber nonwoven. This structure is subsequently transported through an impregnation stretch that brings about a wetting of the fibers with the resin matrix by movements of pressure and fulling. At the end of the machine the structure his wound onto rolls or deposited in suitable containers.

Usually, a ripening process is carried out that can be initiated in a chemical and/or physical manner. The ripening process usually lasts 0.5 to 14 days, especially preferably 1 to 7 days. After this ripening process the SMC can be further processed. After the carrier foils have been drawn off, the SMC is customarily processed or pressed in heated steel tools to form parts.

A resin mat in accordance with the invention preferably has a thickness in the range of 1 to 20 mm, especially preferably in the range of 2 to 10 mm. The weight per unit area of preferred resin mats is preferably in the range of 1000 to 800 g/m$^2$, especially preferably in the range of 2000 to 4000 g/m$^2$.

The resin mats of the present invention preferably have a high flowability. This eliminates the need to insert the resin mats precisely into the form. The flowability of the resin mats is preferably so high that preferably only 25% to 80%, especially preferably only 30 to 49% of the press form has to be covered.

The resin mats in accordance with the invention can be used in many ways. They can serve in particular to manufacture fiber-reinforced components that should offer good resistance to temperature and to solvents as well as high rigidity, strength and impact resistance even at rather low temperatures.

The components obtainable from the resin mats can preferably have a class A surface quality.

The resin mats in accordance with the invention are therefore especially suitable for automobile parts. Also, the resin mats are an ideal material for the electrical, furniture and sanitary industries on account of their good mechanical properties.

The surface of the parts manufactured from the resin mats can be processed and improved by known means.

For example, foils or fine-layer resins can be applied before or after the hardening of the resin mats.

For example, the resin mats can be provided with a layer of thermoplastic polymer in order to obtain an excellent surface quality after the forming. Such composite materials are described, e.g., in EP 0 361 823 as well as in EP 1 322 460.

The invention claimed is:

1. A method for the manufacture of sheet molding compounds (SMC) comprising the steps:
   A) Application of a resin layer on a carrier foil,
   B) In-line production of a glass-fiber nonwoven of prefabricated cut glass staple fibers or prefabricated cut glass fiber rovings eliminating an inline cutting process by using an airlaid method and depositing of the nonwoven on the coated carrier foil obtained according to step A),
   C) Application of a further resin layer and of a further carrier foil on the areal structure obtained according to step B),
   characterized in that the glass-fiber nonwoven formed in step B) has an inhomogeneity of at the most 10%, weight per unit area basis, and a weight per unit area of at least 400 g/m$^2$ and that no binder is added to the glass-fiber nonwoven.

2. The method according to claim 1, characterized in that the glass nonwoven has a strength of less than 10 N.

3. The method according to claim 1, characterized in that the glass nonwoven has an inhomogeneity of 2.5% or less.

4. The method according to claim 1, characterized in that the glass nonwoven has a weight per unit area of 400 g/m² to 2500 g/m².

5. The method according to claim 1, characterized in that the glass nonwoven also contains further fibers that are not binding fibers.

6. The method according to claim 5, characterized in that the further fibers are selected from the group consisting of carbon fibers, mineral fibers and aramid fibers.

7. The method according to claim 1, characterized in that the glass nonwoven is formed and directly deposited on the resin-coated carrier foil and is not supplied in the form of an already prefabricated and strengthened glass nonwoven.

8. The method according to claim 1, characterized in that the glass nonwoven is not subjected to any additional mechanical strengthening before it is further processed.

9. The method according to claim 1, wherein at least 50% by weight of the glass fibers are in the form of bundles.

10. The method according to claim 1, wherein at least 70% by weight of the glass fibers are in the form of bundles.

* * * * *